United States Patent
Inoue et al.

(10) Patent No.: US 12,371,058 B2
(45) Date of Patent: Jul. 29, 2025

(54) VEHICLE TRAVEL CONTROL DEVICE

(71) Applicants: TOYOTA JIDOSHA KABUSHIKI KAISHA, Toyota (JP); DENSO CORPORATION, Kariya (JP)

(72) Inventors: Go Inoue, Gotemba (JP); Yoshinori Watanabe, Isehara (JP); Hirotaka Tokoro, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 110 days.

(21) Appl. No.: 18/355,184

(22) Filed: Jul. 19, 2023

(65) Prior Publication Data

US 2023/0356749 A1 Nov. 9, 2023

Related U.S. Application Data

(63) Continuation of application No. 18/056,575, filed on Nov. 17, 2022, now Pat. No. 11,753,032, which is a
(Continued)

(30) Foreign Application Priority Data

Apr. 24, 2019 (JP) ................ 2019-083227

(51) Int. Cl.
*B60W 10/20* (2006.01)
*B60W 30/12* (2020.01)
*B60W 60/00* (2020.01)

(52) U.S. Cl.
CPC ........ *B60W 60/0011* (2020.02); *B60W 30/12* (2013.01); *B60W 60/0015* (2020.02)

(58) Field of Classification Search
CPC ............ B60W 60/0011; B60W 30/12; B60W 60/0015; B60W 50/0205; B60W 50/029;
(Continued)

(56) References Cited

U.S. PATENT DOCUMENTS

| 5,646,850 A | 7/1997 | Ishida et al. |
| 9,533,681 B2 | 1/2017 | Kodaira |

(Continued)

FOREIGN PATENT DOCUMENTS

| CN | 103827937 A | 5/2014 |
| DE | 10018556 A1 | 10/2001 |

(Continued)

OTHER PUBLICATIONS

JP2016215979.translate (Year: 2016).*
(Continued)

*Primary Examiner* — B M M Hannan
(74) *Attorney, Agent, or Firm* — Sughrue Mion, PLLC

(57) ABSTRACT

A vehicle travel control device executes trajectory following control to make the vehicle follow a target trajectory. A delay time represents control delay of the trajectory following control. A delay compensation time is at least a part of the delay time. The trajectory following control includes: displacement estimation processing that estimates a displacement of the vehicle in the delay compensation time; and delay compensation processing that corrects a deviation between the vehicle and the target trajectory based on the estimated displacement to compensate the control delay. The displacement estimation processing is effective in an effective period and ineffective in an ineffective period. When the ineffective period is included in the delay time of the trajectory following control, the displacement estimation processing is executed in a temporary mode by using sensor-detected information in the effective period without using the sensor-detected information in the ineffective period.

5 Claims, 15 Drawing Sheets

Related U.S. Application Data continuation of application No. 16/801,912, filed on Feb. 26, 2020, now Pat. No. 11,529,970.

(58) Field of Classification Search
CPC . B60W 2050/0011; B60W 2050/0012; B60W 2050/0042; B60W 2050/0215; B60W 2050/0292; B60W 2520/10; B60W 2520/105; B60W 2520/125; B60W 2520/14; B60W 2540/18; B60W 2556/50; B60W 2720/14; B60W 10/18; B60W 10/20; B60W 40/02
USPC .......................................................... 701/23
See application file for complete search history.

(56) References Cited

U.S. PATENT DOCUMENTS

| | | | |
|---|---|---|---|
| 10,953,876 B2* | 3/2021 | Gotou | B60W 30/16 |
| 11,529,970 B2 | 12/2022 | Inoue et al. | |
| 2003/0120414 A1 | 6/2003 | Ishida et al. | |
| 2006/0142922 A1 | 6/2006 | Matsumoto et al. | |
| 2009/0287376 A1 | 11/2009 | Aso et al. | |
| 2010/0324823 A1 | 12/2010 | Kobayashi et al. | |
| 2013/0070013 A1* | 3/2013 | Iesaki | B41J 11/42 318/635 |
| 2014/0012469 A1 | 1/2014 | Kunihiro | |
| 2014/0229068 A1 | 8/2014 | Ueyama et al. | |
| 2015/0298691 A1 | 10/2015 | Kodaira et al. | |
| 2017/0115662 A1* | 4/2017 | Mori | B60W 30/02 |
| 2017/0120909 A1 | 5/2017 | Oniwa et al. | |
| 2017/0240186 A1* | 8/2017 | Hatano | B60W 50/087 |
| 2018/0043934 A1 | 2/2018 | Okawa | |
| 2018/0057054 A1 | 3/2018 | Tokoro | |
| 2018/0086341 A1 | 3/2018 | Taniguchi | |
| 2018/0178802 A1* | 6/2018 | Miyata | B60W 30/095 |
| 2018/0297594 A1* | 10/2018 | Takahashi | G05D 1/0891 |
| 2018/0297638 A1* | 10/2018 | Fujii | B60W 30/12 |
| 2018/0345959 A1 | 12/2018 | Fuji | |
| 2018/0345967 A1 | 12/2018 | Oniwa | |
| 2018/0345978 A1 | 12/2018 | Fuji | |
| 2018/0354519 A1* | 12/2018 | Miyata | B60W 30/18163 |
| 2018/0357904 A1 | 12/2018 | Miyata | |
| 2019/0084561 A1* | 3/2019 | Takeda | B60W 40/072 |
| 2019/0118829 A1 | 4/2019 | Goldberg | |
| 2019/0152476 A1 | 5/2019 | Hajika et al. | |
| 2019/0210598 A1 | 7/2019 | Endo | |
| 2020/0391737 A1* | 12/2020 | Gotou | B60K 31/00 |
| 2021/0309289 A1* | 10/2021 | Ueno | B62D 5/0421 |
| 2021/0342603 A1 | 11/2021 | Hori | |
| 2022/0118995 A1* | 4/2022 | Ueno | B60W 60/001 |
| 2023/0072740 A1 | 3/2023 | Inoue et al. | |

FOREIGN PATENT DOCUMENTS

| | | | |
|---|---|---|---|
| DE | 112010006048 T5 * | 9/2013 | ............ B60W 10/18 |
| DE | 112013006493 T5 * | 11/2015 | .......... B60W 30/045 |
| DE | 102018108572 A1 * | 10/2018 | ............ B60W 30/12 |
| DE | 112015000480 B4 | 2/2021 | |
| EP | 1798621 A2 | 6/2007 | |
| EP | 3369634 A1 * | 9/2018 | ............. B60L 15/20 |
| JP | 2827591 B2 * | 3/1993 | |
| JP | 2928876 B | 9/1995 | |
| JP | 10-147252 A | 6/1998 | |
| JP | 2002063682 A | 2/2002 | |
| JP | 3897740 B2 * | 3/2007 | ......... B62D 15/0285 |
| JP | 4974204 B2 | 7/2012 | |
| JP | 2016-084093 A | 5/2016 | |
| JP | 2018-024295 A | 2/2018 | |
| JP | 2018203101 A * | 12/2018 | ........ B60W 30/0953 |
| KR | 20180133330 A * | 12/2018 | |
| KR | 20200008657 A * | 12/2018 | |
| RU | 2724213 C1 * | 6/2020 | ............. B60K 31/00 |
| WO | WO-2008072515 A1 * | 6/2008 | ............ B60W 10/12 |
| WO | WO-2017141765 A1 * | 8/2017 | ........ B60W 30/0956 |
| WO | WO-2018056023 A1 * | 3/2018 | ............ B60T 8/1755 |
| WO | WO-2019008648 A1 * | 1/2019 | ............. B60K 31/00 |
| WO | WO-2020152977 A1 * | 7/2020 | ............ B60W 30/10 |

OTHER PUBLICATIONS

Communication dated Aug. 18, 2022 issued in United States Patent and Trademark Office in U.S. Appl. No. 16/801,912.
Communication dated Dec. 1, 2021 issued in United States Patent and Trademark Office in U.S. Appl. No. 16/801,912.
Hussein Obeid, Barrier function-based adaptive sliding mode control, Mar. 21, 2018, Elsehier Enhanced Reader, p. 541 (Year: 2018).
Communication dated Aug. 1, 2023 issued in United States Patent and Trademark Office in U.S. Appl. No. 18/056,575.

* cited by examiner

VEHICLE TRAVEL CONTROL DEVICE

CROSS-REFERENCES TO RELATED APPLICATIONS

The present application is a Continuation Application of U.S. application Ser. No. 18/056,575 filed on Nov. 17, 2022, which is a Continuation Application of U.S. application Ser. No. 16/801,912 filed on Feb. 26, 2020, now U.S. Pat. No. 11,529,970, which claims priority to Japanese Patent Application No. 2019-083227 filed on Apr. 24, 2019, the disclosures of which are incorporated herein by reference in their entireties.

BACKGROUND

Technical Field

The present disclosure relates to a vehicle travel control device that controls travel of a vehicle so as to follow a target trajectory.

Background Art

Trajectory following control that controls travel of a vehicle so as to follow a target trajectory is known. In the trajectory following control, control delay may occur due to various causes. The causes of the control delay include a calculation processing time, an information communication time, and so forth. For example, calculating the target trajectory requires a certain amount of time, and the target trajectory calculation time causes the control delay. The control delay leads to decrease in performance (ability) of following the target trajectory.

Patent Literature 1 discloses a driving assist system intended to suppress a time delay when acquiring a travel state of a vehicle to stably execute vehicle control. More specifically, the driving assist system acquires an image including a track boundary and generates a target trajectory based on the acquired image. Moreover, the driving assist system acquires a lateral position of the vehicle in the track based on the acquired image. Then, the driving assist system executes the trajectory following control based on the target trajectory and the lateral position of the vehicle.

When acquiring the lateral position of the vehicle, it takes some time to generate image data and process the image data. In order to compensate the time delay, the driving assist system corrects the lateral position acquired based on the image. More specifically, the driving assist system uses a yaw rate and a vehicle speed detected by sensors to estimate a lateral displacement of the vehicle in a period equivalent to the time delay. Then, the driving assist system adds the estimated lateral displacement to the lateral position to correct the lateral position.

LIST OF RELATED ART

Patent Literature 1: Japanese Laid-Open Patent Application Publication No. JP-2018-024295

SUMMARY

According to the technique disclosed in the above-described Patent Literature 1, delay compensation processing that compensates the control delay of the trajectory following control is executed. To that end, the displacement of the vehicle in the period equivalent to the control delay is estimated by using the travel state detected by the sensor.

However, if the sensor fails, the detected travel state becomes incorrect. The displacement estimated based on the incorrect travel state becomes an abnormal value that does not reflect actual vehicle travel. As a result, the delay compensation processing is executed without reflecting the actual vehicle travel, and thus trajectory following performance of the trajectory following control is decreased to the contrary. It may be considered to halt the delay compensation processing. However, when the delay compensation processing is not executed at all, the trajectory following performance of the trajectory following control is decreased after all.

An object of the present disclosure is to provide a technique that can suppress decrease in the trajectory following performance of the trajectory following control.

A first aspect is directed to a vehicle travel control device that controls travel of a vehicle.

The vehicle travel control device includes:
 a sensor configured to detect a travel state of the vehicle; and
 a control device configured to execute trajectory following control that generates a target trajectory and controls travel of the vehicle such that the vehicle follows the target trajectory.

A delay time is a time representing control delay of the trajectory following control.

A delay compensation time is at least a part of the delay time.

The trajectory following control includes:
 information acquisition processing that acquires sensor-detected information indicating a result of detection by the sensor;
 displacement estimation processing that estimates a displacement of the vehicle in the delay compensation time based on the sensor-detected information;
 delay compensation processing that corrects a deviation between the vehicle and the target trajectory based on the estimated displacement to compensate the control delay; and
 travel control processing that controls the travel of the vehicle such that the deviation decreases after the delay compensation processing.

The control device is further configured to determine an effective period in which the displacement estimation processing is effective and an ineffective period in which the displacement estimation processing is ineffective, based on at least one of a state of the sensor and the sensor-detected information.

When the ineffective period is included in the delay time of the trajectory following control, the control device executes the displacement estimation processing in a temporary mode.

In the temporary mode, the control device executes the displacement estimation processing by using at least the sensor-detected information in the effective period without using the sensor-detected information in the ineffective period.

A second aspect further has the following feature in addition to the first aspect.

When both the effective period and the ineffective period are included in the delay time of the trajectory following control, the control device sets the effective period included in the delay time as the delay compensation time used in the temporary mode.

A third aspect further has the following feature in addition to the first aspect.

In the temporary mode, the control device is configured to:
estimate the travel state in the ineffective period based on the sensor-detected information in the effective period to acquire estimated travel state information indicating the estimated travel state;
set the delay time as the delay compensation time; and
execute the displacement estimation processing by using the sensor-detected information in the effective period and the estimated travel state information in the ineffective period.

A fourth aspect further has the following feature in addition to the second aspect.

When a length of the effective period included in the delay time of the trajectory following control is less than a threshold, the control device is configured to:
estimate the travel state in the ineffective period based on the sensor-detected information in the effective period to acquire estimated travel state information indicating the estimated travel state;
set the delay time as the delay compensation time; and
execute the displacement estimation processing by using the sensor-detected information in the effective period and the estimated travel state information in the ineffective period.

A fifth aspect further has the following feature in addition to any one of the first to fourth aspects.

When the ineffective period is not included in the delay time of the trajectory following control, the control device executes the displacement estimation processing in a normal mode.

In the normal mode, the control device sets the delay time as the delay compensation time and executes the displacement estimation processing by using the sensor-detected information in the delay time.

The control device switches a mode of the displacement estimation processing between the normal mode and the temporary mode according to whether or not the ineffective period is included in the delay time of the trajectory following control.

A sixth aspect further has the following feature in addition to the fifth aspect.

In the travel control processing, the control device calculates a target turning angle based on the deviation between the vehicle and the target trajectory and executes feedback control such that an actual turning angle follows the target turning angle.

When the displacement estimation processing is executed in the temporary mode, the control device decreases a control gain used for calculating the target turning angle from the deviation as compared with a case where the displacement estimation processing is executed in the normal mode.

According to the present disclosure, the control device determines the effective period in which the displacement estimation processing is effective and the ineffective period in which the displacement estimation processing is ineffective. When the ineffective period is included in the delay time of the trajectory following control, the control device executes the displacement estimation processing in the temporary mode. In the temporary mode, the control device executes the displacement estimation processing by using the sensor-detected information in the effective period without using the sensor-detected information in the ineffective period. Since the sensor-detected information in the ineffective period is not used, it is possible to suppress decrease in accuracy of the displacement estimation processing and thus the delay compensation processing. As a result, decrease in the trajectory following performance of the trajectory following control is suppressed. Moreover, according to the present disclosure, when the ineffective period is included in the delay time of the trajectory following control, the control device does not totally give up the displacement estimation processing but executes the displacement estimation processing in the temporary mode as much as possible. Therefore, decrease in the trajectory following performance of the trajectory following control is suppressed, as compared with a case where the displacement estimation processing and the delay compensation processing are not executed at all.

EMBODIMENTS

Embodiments of the present disclosure will be described below with reference to the attached drawings.

1. Vehicle Travel Control Device

Figure 1:
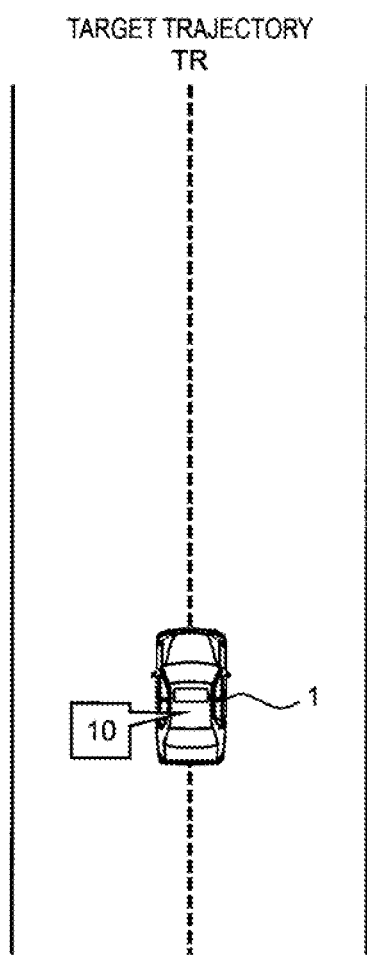
FIG. 1 is a conceptual diagram for explaining a vehicle travel control device according to an embodiment of the present disclosure.

FIG. 1 is a conceptual diagram for explaining a vehicle travel control device 10 according to the present embodiment. The vehicle travel control device 10 is installed on a vehicle 1 and executes vehicle travel control that controls travel (i.e., steering, acceleration, and deceleration) of the vehicle 1. In particular, the vehicle travel control device 10 executes "trajectory following control" being a kind of the vehicle travel control. In the trajectory following control, the vehicle travel control device 10 periodically generates a target trajectory TR and controls the travel of the vehicle 1 such that the vehicle 1 follows the target trajectory TR. Such the trajectory following control is executed in automated driving control, lane keep assist control (or LTA: Lane Tracing Assist), and so forth.

Figure 2:
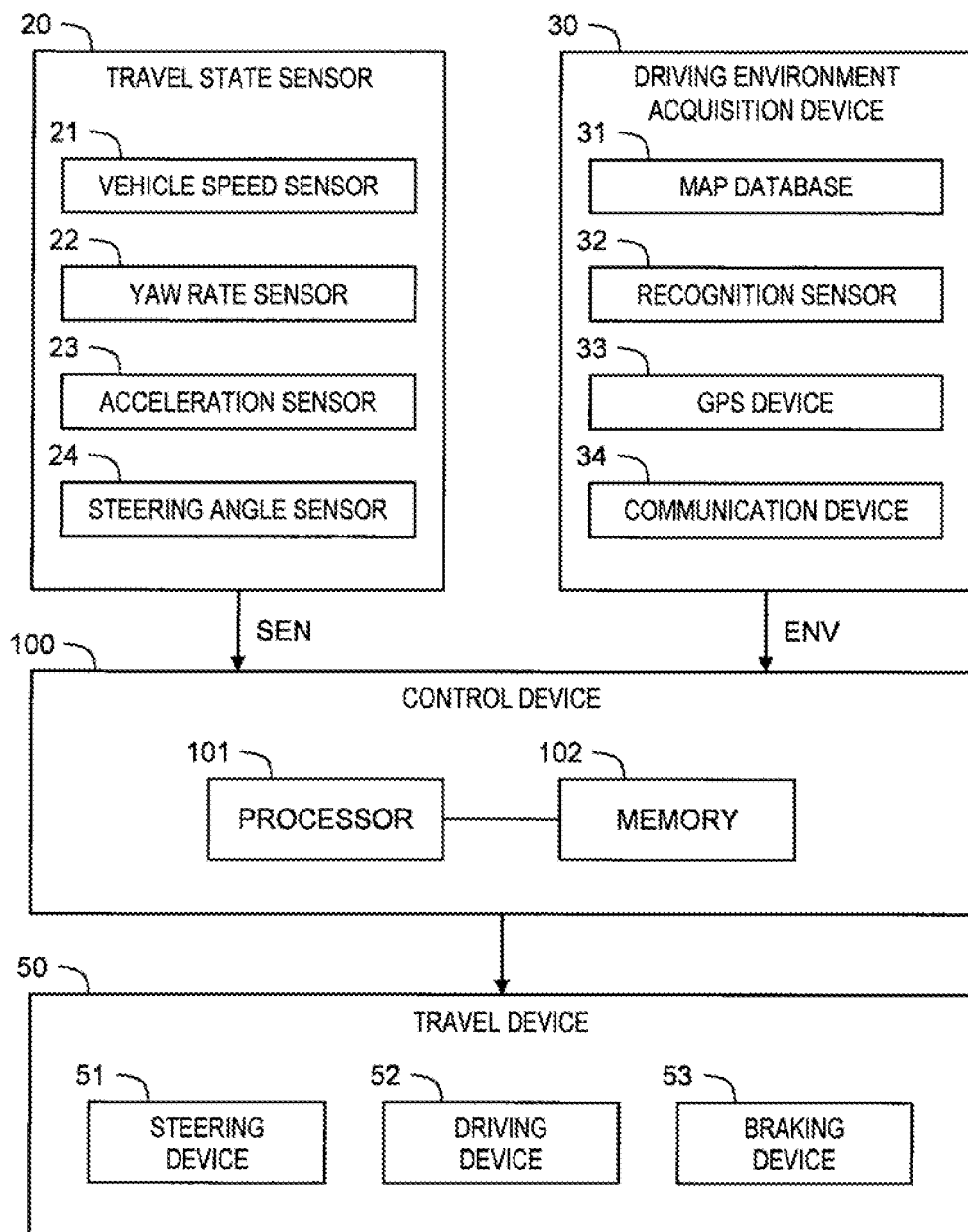
FIG. 2 is a block diagram showing a configuration example of the vehicle travel control device according to the embodiment of the present disclosure.

FIG. 2 is a block diagram showing a configuration example of the vehicle travel control device 10 according to the present embodiment. The vehicle travel control device 10 includes a travel state sensor 20, a driving environment acquisition device 30, a travel device 50, and a control device (controller) 100.

The travel state sensor 20 detects a travel state of the vehicle 1. For example, the travel state sensor 20 includes a vehicle speed sensor 21, a yaw rate sensor 22, an acceleration sensor 23, a steering angle sensor 24, and the like. The vehicle speed sensor 21 detects a vehicle speed V being a speed of the vehicle 1. The yaw rate sensor 22 detects a yaw rate YR of the vehicle 1. The acceleration sensor 23 detects accelerations (e.g., a lateral acceleration, a longitudinal acceleration, and a vertical acceleration) of the vehicle 1. The steering angle sensor 24 detects a steering angle of a steering wheel and a turning angle of a wheel. Sensor-detected information SEN indicates a result of detection by the travel state sensor 20. The travel state sensor 20 sends the sensor-detected information SEN to the control device 100.

The driving environment acquisition device 30 acquires driving environment information ENV indicating driving environment for the vehicle 1. For example, the driving environment acquisition device 30 includes a map database 31, a recognition sensor 32, a GPS (Global Positioning System) device 33, a communication device 34, and so forth.

The map database 31 is a database of map information indicating a lane configuration and a road shape. The driving environment acquisition device 30 acquires the map information of a required area from the map database 31. The map database 31 may be stored in a certain memory device mounted on the vehicle 1, or may be stored in a management server outside the vehicle 1. In the latter case, the driving environment acquisition device 30 communicates with the management server through the communication device 34 to acquire the necessary map information from the map database 31 of the management server.

The recognition sensor 32 recognizes (detects) a situation around the vehicle 1. For example, the recognition sensor 32 includes a camera, a LIDAR (Laser Imaging Detection and Ranging), and a radar. Surrounding situation information indicates a result of recognition (perception) by the recognition sensor 32. For example, the surrounding situation information includes information on a surrounding vehicle and a white line around the vehicle 1.

The GPS device 33 acquires position information that indicates a position and an azimuth (orientation) of the vehicle 1. Matching a configuration of the white line detected by the recognition sensor 32 and the lane configuration indicated by the map information makes it possible to acquire further accurate position information. As another example, the position information may be acquired through V2X communication (i.e., vehicle-to-vehicle communication and vehicle-to-infrastructure communication) using the communication device 34.

The driving environment information ENV includes the map information, the surrounding situation information, and the position information described above. The driving environment acquisition device 30 sends the acquired driving environment information ENV to the control device 100.

The travel device 50 includes a steering device 51, a driving device 52, and a braking device 53. The steering device 51 turns (i.e., changes a direction of) the wheel. For example, the steering device 51 includes a power steering (EPS: Electric Power Steering) device. The driving device 52 is a power source that generates a driving force. The driving device 52 is exemplified by an engine and an electric motor. The braking device 53 generates a braking force. An operation of the travel device 50 is controlled by the control device 100.

The control device (controller) 100 includes a microcomputer including a processor 101 and a memory 102. The control device 100 is also called an ECU (Electronic Control Unit). A variety of processing by the control device 100 is achieved by the processor 101 executing a control program stored in the memory 102.

For example, the control device 100 executes the vehicle travel control that controls the travel of the vehicle 1 by controlling the travel device 50. The vehicle travel control includes steering control and acceleration/deceleration control. The control device 100 executes the steering control by controlling the steering device 51. Moreover, the control device 100 executes the acceleration/deceleration control by controlling the driving device 52 and the braking device 53.

In particular, the control device 100 executes the trajectory following control as a kind of the vehicle travel control. More specifically, the control device 100 periodically generates a target trajectory TR based on the driving environment information ENV. For example, the target trajectory TR includes a line along a center of a travel lane. The control device 100 can calculate the target trajectory TR based on the map information and the position information. As another example, the control device 100 can calculate the target trajectory TR based on the surrounding situation information (specifically, the information on the white line). However, the target trajectory TR and a method of calculating thereof are not limited to those. The control device 100 generates the target trajectory TR and then executes the vehicle travel control such that the vehicle 1 follows the target trajectory TR.

Hereinafter, the trajectory following control according to the present embodiment will be described in more details.

2. Trajectory Following Control

2-1. Basic Trajectory Following Control

Figure 3:
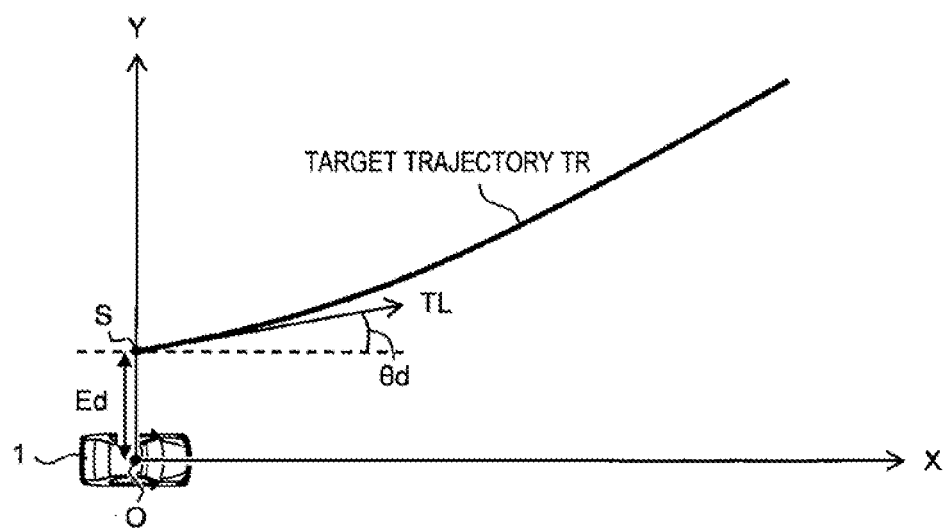
FIG. 3 is a conceptual diagram for explaining basic trajectory following control.

FIG. 3 is a conceptual diagram for explaining basic trajectory following control. First, a coordinate system (X, Y) is defined. In the example shown in FIG. 3, an origin O is located at a center of the vehicle 1. An X-direction is a forward direction of the vehicle 1, and a Y-direction is a planar direction orthogonal to the X-direction. However, the coordinate system (X, Y) is not limited to the example shown in FIG. 3.

The target trajectory TR is defined in the coordinate system (X, Y) at a certain timing. A point S on the target trajectory TR is a point located in the Y-direction from the origin O. A lateral deviation Ed (i.e., a Y-direction deviation) is a distance between the origin O and the point S, that is, a distance between the vehicle 1 and the target trajectory TR. A yaw angle deviation Od (i.e., an azimuth angle deviation) is an angle between the X-direction and a tangent line TL to the target trajectory TR at the point S.

The control device 100 executes the vehicle travel control such that the deviation (i.e., the lateral deviation Ed and the yaw angle deviation θd) between the vehicle 1 and the target trajectory TR decreases. As a result, the trajectory following control is achieved.

However, in the trajectory following control, control delay may occur due to various causes. The causes of the control delay include a calculation processing time, an information communication time, and so forth. For example, calculating the target trajectory TR requires a certain amount of time, and the target trajectory calculation time causes the control delay. The control delay of the trajectory following control leads to decrease in performance (ability) of following the target trajectory TR, which is not desirable.

In view of the above, the control device 100 corrects the lateral deviation Ed and the yaw angle deviation Od so as to compensate the control delay. The processing that corrects the lateral deviation Ed and the yaw angle deviation θd so as to compensate the control delay is hereinafter referred to as "delay compensation processing."

Figure 4:
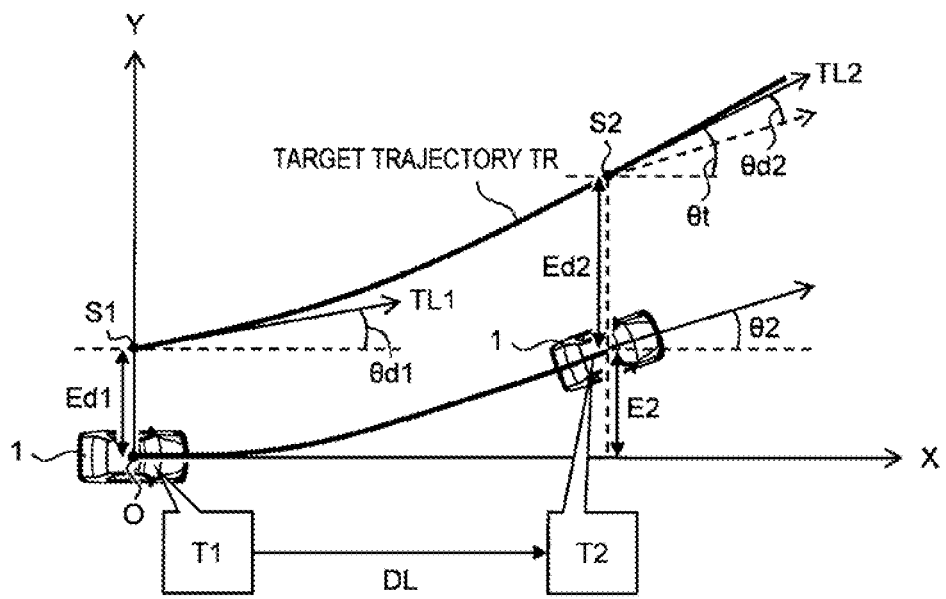
FIG. 4 is a conceptual diagram for explaining delay compensation processing in the trajectory following control.

FIG. 4 is a conceptual diagram for explaining the delay compensation processing. At a first timing T1, the control device 100 acquires the driving environment information ENV necessary for calculating the target trajectory TR. Then, the control device 100 calculates the target trajectory TR based on the driving environment information ENV acquired. The target trajectory TR calculated based on the driving environment information ENV acquired at the first timing T1 is defined in the coordinate system (X, Y) defined at the first timing T1. The lateral deviation Ed and the yaw angle deviation θd at the first timing T1 are a lateral deviation Ed1 and a yaw angle deviation θd1, respectively.

Next, a delay time DL representing the control delay of the trajectory following control is considered. The delay time DL includes the calculation processing time, the information communication time, and the like. A timing later than the first timing T1 by the delay time DL is a second timing T2. The lateral deviation Ed and the yaw angle deviation θd at the second timing T2 are a lateral deviation Ed2 and a yaw angle deviation θd2, respectively.

The delay compensation processing includes processing that corrects the lateral deviation Ed1 and the yaw angle deviation θd1 at the first timing T1 to the lateral deviation Ed2 and the yaw angle deviation θd2 at the second timing T2, respectively. For that purpose, a displacement (i.e. an amount of movement) of the vehicle 1 in the delay time DL is necessary. The displacement includes amounts of change in a position and a yaw angle of the vehicle 1.

In the example shown in FIG. 4, a lateral position is an Y-direction position, and a yaw angle is an angle with the X-direction. The lateral position and the yaw angle of the vehicle 1 at the first timing T1 each is 0. A yaw angle θ after the first timing T1 can be calculated (estimated) by integrating the yaw rate YR detected by the yaw rate sensor 22. A yaw angle θ2 at the second timing T2 can be calculated (estimated) by integrating the yaw rate YR over the delay time DL.

In addition, an X-direction velocity and a Y-direction velocity are calculated based on the yaw angle θ and the vehicle speed V. An X-direction displacement and a Y-direction displacement can be calculated (estimated) by integrating the X-direction velocity and the Y-direction velocity over the delay time DL, respectively. The Y-direction displacement is equivalent to a lateral position E2 of the vehicle 1 at the second timing T2.

In this manner, it is possible to estimate the displacement of the vehicle 1 in the delay time DL based on the sensor-detected information SEN (i.e., the vehicle speed V and the yaw rate YR). This processing is hereinafter referred to as "displacement estimation processing." The displacement estimation processing is also called "dead reckoning."

A point S2 on the target trajectory TR is a point located in the Y-direction from the vehicle 1 at the second timing T2. The lateral position of the point S2 is a target lateral position Et. The yaw angle of a tangent line TL2 to the target trajectory TR at the point S2 is a target yaw angle θt. The target lateral position Et and the target yaw angle θt can be calculated from the X-direction displacement and information on a position and a curvature of the target trajectory TR. A difference between the target lateral position Et and the lateral position E2 of the vehicle 1 is the lateral deviation Ed2 at the second timing T2. A difference between the target yaw angle θt and the yaw angle θ2 of the vehicle 1 is the yaw angle deviation θd2 at the second timing T2.

In this manner, it is possible to calculate the lateral deviation Ed2 and the yaw angle deviation θd2 at the second timing T2 based on the result of the displacement estimation processing and the information on the target trajectory TR. In other words, it is possible to correct the lateral deviation Ed and the yaw angle deviation θd so as to compensate the control delay. Furthermore, correction (i.e., coordinate transformation) of the target trajectory TR may be performed based on the latest coordinate system (X, Y) defined at the second timing T2. The lateral deviation Ed and the yaw angle deviation Od are corrected also by the correction of the target trajectory TR.

The trajectory following control is executed based on the lateral deviation Ed2 and the yaw angle deviation θd2 acquired by the delay compensation processing. As a result, trajectory following performance of the trajectory following control is improved.

2-2. Example of Processing by Control Device

Figure 5:
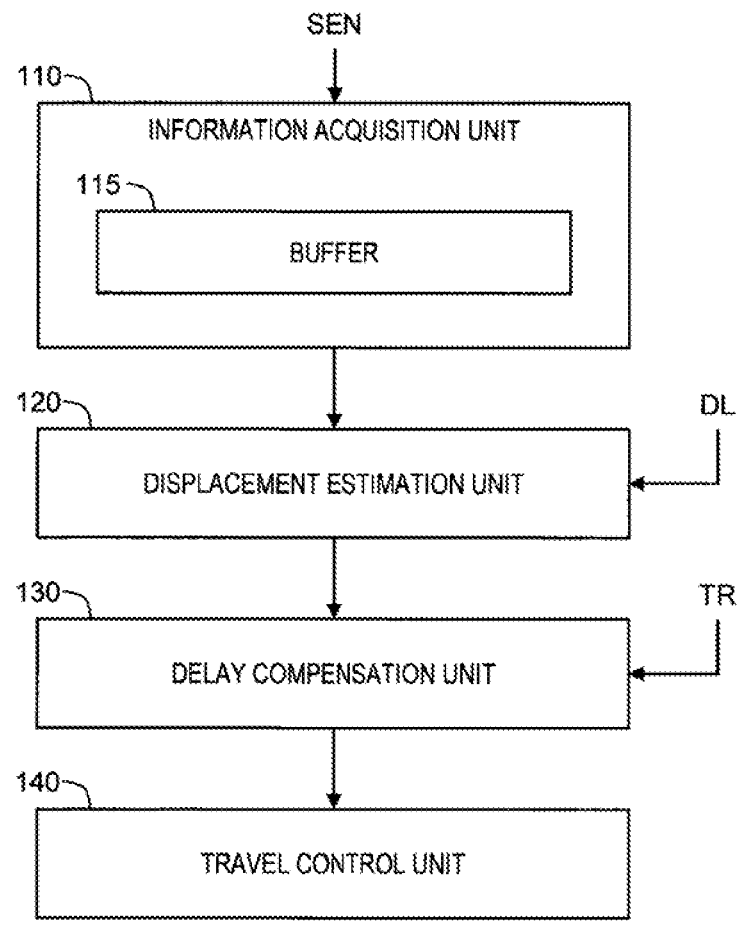
FIG. 5 is a block diagram showing a functional configuration example of a control device related to the trajectory following control according to the embodiment of the present disclosure.

FIG. 5 is a block diagram showing a functional configuration example of the control device 100 related to the trajectory following control according to the present embodiment. The control device 100 includes an information acquisition unit 110, a displacement estimation unit 120, a delay compensation unit 130, and a travel control unit 140 as functional blocks. These functional blocks are achieved by the processor 101 of the control device 100 executing a control program stored in the memory 102. The information acquisition unit 110 includes a buffer 115 for storing information. The buffer 115 is achieved by the memory 102.

Figure 6:
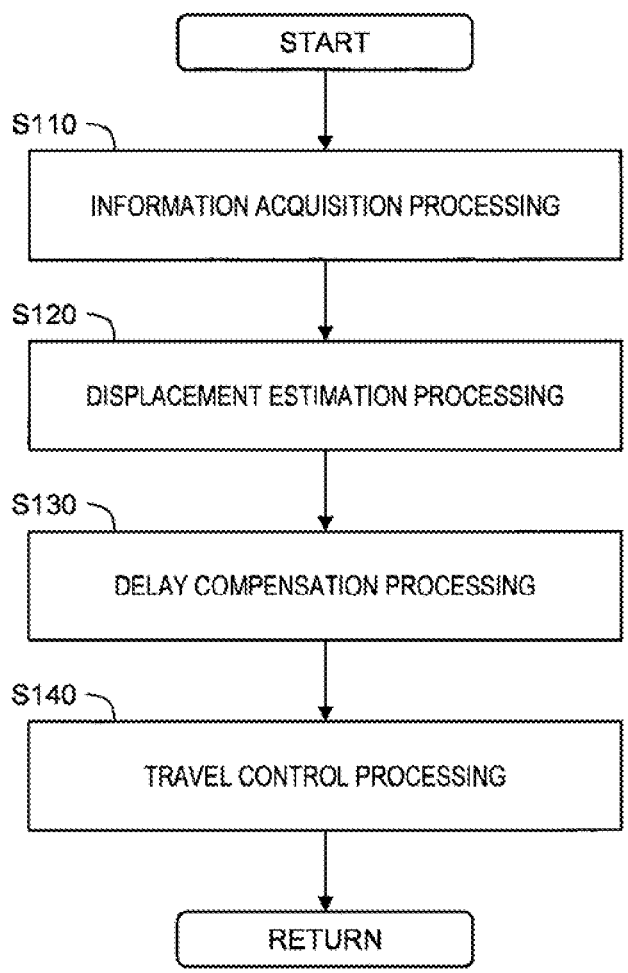
FIG. 6 is a flow chart showing the trajectory following control according to the embodiment of the present disclosure.

FIG. 6 is a flow chart showing the trajectory following control according to the present embodiment. Each processing in the trajectory following control according to the present embodiment will be described with reference to FIGS. 5 and 6.

2-2-1. Information Acquisition Processing (Step S110)

The information acquisition unit 110 executes information acquisition processing. More specifically, the information acquisition unit 110 acquires the sensor-detected information SEN indicating the result of detection by the travel state sensor 20. As described above, the sensor-detected information SEN includes the vehicle speed V, the yaw rate YR, the acceleration, and so forth. The information acquisition unit 110 stores the sensor-detected information SEN in the buffer 115.

2-2-2. Displacement Estimation Processing (Step S120)

The displacement estimation unit 120 executes the displacement estimation processing (i.e., the dead reckoning). The basic explanation was given in the above Section 2-1 and FIG. 4 by the use of the delay time DL of the trajectory following control. The delay time DL is an actual time of the control delay. For example, the delay time DL is beforehand measured and given as a predetermined value. As another example, the delay time DL may be a difference between a time stamp of the target trajectory TR (i.e., the first timing T1) and a current time.

According to the present embodiment, the delay time DL is not necessarily used as it is in the displacement estimation processing. In the displacement estimation processing according to the present embodiment, a "delay compensation time L" being at least a part of the delay time DL is used. The displacement estimation unit 120 sets the delay compensation time L to be equal to or less than the delay time DL. Examples of the setting of the delay compensation time L will be described in detail in Section 3 below.

The displacement estimation unit 120 estimates the displacement (i.e., the amount of movement) of the vehicle 1 in the delay compensation time L based on the sensor-detected information SEN. More specifically, the displacement estimation unit 120 acquires the sensor-detected information SEN in the delay compensation time L from the buffer 115. Then, the displacement estimation unit 120 estimates the displacement of the vehicle 1 in the delay compensation time L based on the sensor-detected information SEN in the delay compensation time L. It should be noted that the "delay time DL" in the above Section 2-1 is replaced with the "delay compensation time L." As described above, it is possible to estimate the displacement in the delay compensation time L based on the yaw rate YR and the vehicle speed V for example. In addition, a vehicle slip angle may be taken into consideration. The displacement estimation unit 120 may estimate the displacement by the use of a predetermined displacement estimation model.

2-2-3. Delay Compensation Processing (Step S130)

The delay compensation unit 130 executes the delay compensation processing. More specifically, the delay compensation unit 130 corrects the deviation (i.e., the lateral deviation Ed and the yaw angle deviation θd) between the vehicle 1 and the target trajectory TR so as to compensate the control delay. The displacement of the vehicle 1 in the delay compensation time L is obtained by the displacement estimation processing described above. The delay compensation unit 130 corrects the lateral deviation Ed and the yaw angle deviation Od based on the estimated displacement and the information on the target trajectory TR.

Furthermore, the delay compensation unit 130 may perform correction (i.e., coordinate transformation) of the target trajectory TR based on the latest coordinate system (X, Y) defined at the second timing T2. The lateral deviation Ed and the yaw angle deviation Od are corrected also by the correction of the target trajectory TR.

As a result of the delay compensation processing, the lateral deviation Ed2 and the yaw angle deviation θd2 at the second timing T2 are obtained. The lateral deviation Ed2 and the yaw angle deviation θd2 obtained by the delay compensation processing are used in the following travel control processing.

2-2-4. Travel Control Processing (Step S140)

The travel control unit 140 executes travel control processing that controls the travel of the vehicle 1 such that the lateral deviation Ed2 and the yaw angle deviation θd2 decrease. More specifically, the travel control unit 140 calculates a vehicle control amount required for decreasing the lateral deviation Ed2 and the yaw angle deviation θd2. Then, the travel control unit 140 actuates the travel device 50 in accordance with the calculated vehicle control amount. As a result, it is possible to make the vehicle 1 travel to follow the target trajectory TR.

For example, the steering control using the steering device 51 is as follows. The travel control unit 140 calculates a target yaw rate YRt required for decreasing the lateral deviation Ed2 and the yaw angle deviation θd2. For example, the target yaw rate YRt is expressed in the following Equation (1).

$$YRt = Ga \times Ed2 + Gb \times \theta d2 \qquad \text{Equation (1):}$$

Parameters Ga and Gb in Equation (1) are control gains for the lateral deviation Ed2 and the yaw angle deviation θd2, respectively. Equation (1) may further include a feed-forward term that depends on the curvature of the target trajectory TR.

The travel control unit 140 calculates a target turning angle δt according to a yaw rate deviation that is a difference between the target yaw rate YRt and the actual yaw rate YR. The actual yaw rate YR is detected by the yaw rate sensor 22. The larger the yaw rate deviation is, the larger the target turning angle δt is.

Further, the travel control unit 140 executes feedback control such that an actual turning angle δ follows the target turning angle δt. The actual turning angle δ is detected by the steering angle sensor 24. The feedback control is PID control for example. For example, the travel control unit 140 executes the feedback control based on a deviation between the target turning angle δt and the actual turning angle δ. In this manner, the trajectory following control is achieved.

3. Displacement Estimation Processing

The displacement estimation processing according to the present embodiment will be described below in more details. According to the present embodiment, modes of the displacement estimation processing include two types, a "normal mode" and a "temporary mode."

3-1. Normal Mode

Figure 7:
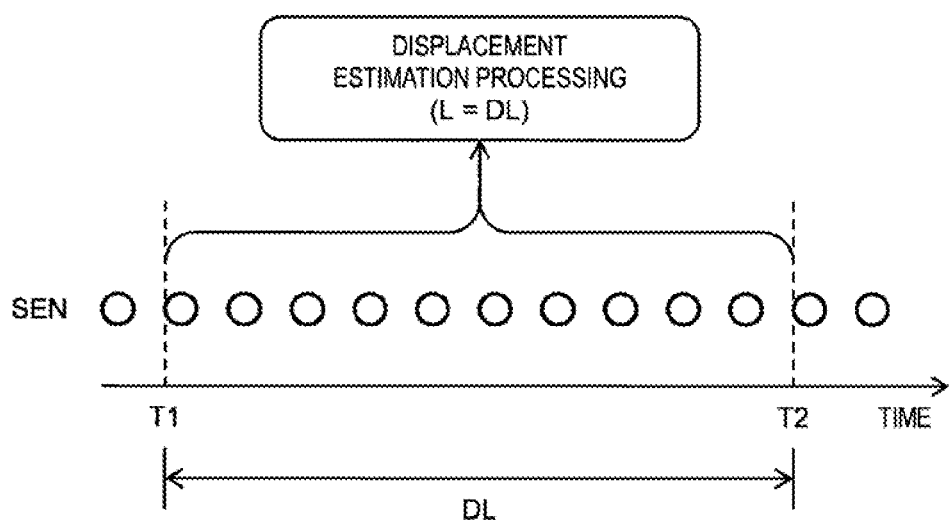
FIG. 7 is a conceptual diagram for explaining a normal mode of displacement estimation processing according to the embodiment of the present disclosure.

FIG. 7 is a conceptual diagram for explaining the normal mode. The control device 100 (the displacement estimation unit 120) sets the delay time DL of the trajectory following control as the delay compensation time L. The delay time DL is beforehand measured and given as a predetermined value. As another example, the delay time DL may be a difference between a time stamp of the target trajectory TR (i.e., the first timing T1) and a current time. The control device 100 executes the displacement estimation processing by using the sensor-detected information SEN in the delay compensation time L (=the delay time DL).

3-2. Temporary Mode

When the travel state sensor 20 is normal, the sensor-detected information SEN also is normal. Therefore, the displacement estimation processing is effective. However, when the travel state sensor 20 fails, the sensor-detected information SEN becomes incorrect and thus the displacement estimation processing becomes ineffective. A period in which the displacement estimation processing is effective is hereinafter referred to as an "effective period PA." On the other hand, a period in which the displacement estimation processing is ineffective is hereinafter referred to as an "ineffective period PB."

Figure 8:
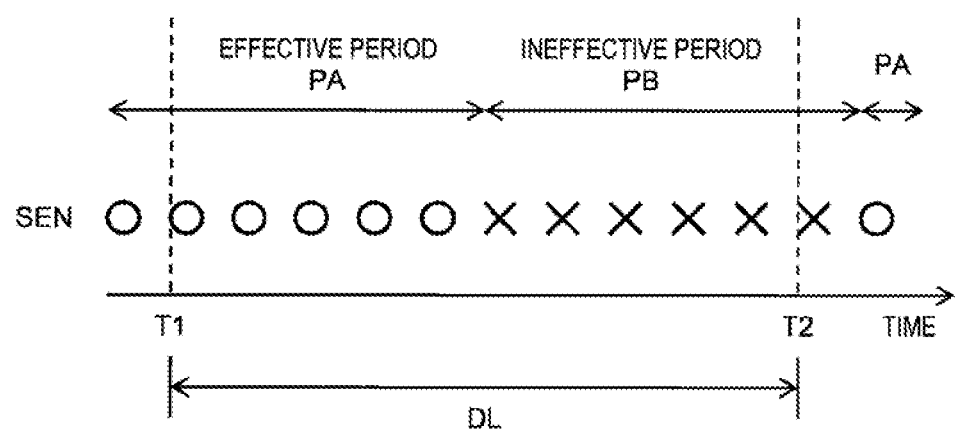
FIG. 8 is a conceptual diagram showing an example of an effective period and an ineffective period related to the displacement estimation processing according to the embodiment of the present disclosure.

FIG. 8 shows an example of the effective period PA and the ineffective period PB. In the example shown in FIG. 8, the ineffective period PB is included in the delay time DL of the trajectory following control. If the displacement estimation processing is executed in the above-described normal mode, the incorrect sensor-detected information SEN in the ineffective period PB is used. The displacement estimated based on the incorrect sensor-detected information SEN becomes an abnormal value that does not reflect actual vehicle travel. As a result, the delay compensation processing is executed without reflecting the actual vehicle travel, and thus the trajectory following performance of the trajectory following control is decreased to the contrary. In order to suppress such the decrease in the trajectory following performance, the "temporary mode" is provided separately from the "normal mode."

When the ineffective period PB is included in the delay time DL of the trajectory following control, the control device 100 (the displacement estimation unit 120) executes the displacement estimation processing in the temporary mode. In the temporary mode, the control device 100 executes the displacement estimation processing by using the sensor-detected information SEN in the effective period PA without using the sensor-detected information SEN in the ineffective period PB.

3-2-1. First Example of Temporary Mode

Figure 9:
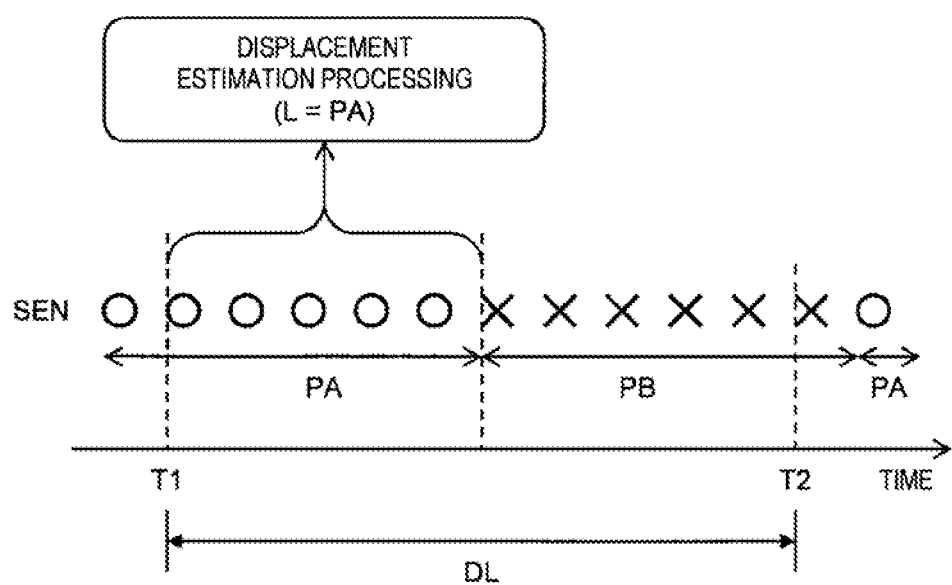
FIG. 9 is a conceptual diagram for explaining a first example of a temporary mode of the displacement estimation processing according to the embodiment of the present disclosure.

FIG. 9 is a conceptual diagram for explaining a first example of the temporary mode. In the first example, the control device 100 does not fix the delay compensation time L but variably sets it. More specifically, both the effective period PA and the ineffective period PB are included in the delay time DL of the trajectory following control, and the control device 100 sets the effective period PA included in the delay time DL as the delay compensation time L. Then, the control device 100 executes the displacement estimation processing by using the sensor-detected information SEN in the delay compensation time L (=the effective period PA). The control device 100 does not use the sensor-detected information SEN in the ineffective period PB.

3-2-2. Second Example of Temporary Mode

Figure 10:
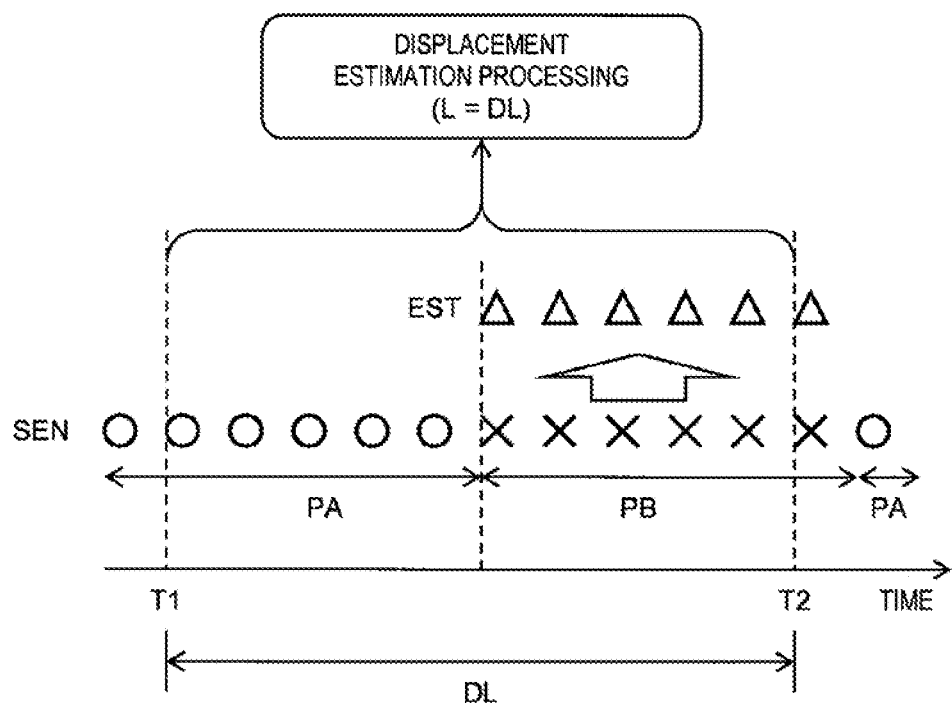
FIG. 10 is a conceptual diagram for explaining a second example of the temporary mode of the displacement estimation processing according to the embodiment of the present disclosure.

FIG. 10 is a conceptual diagram for explaining a second example of the temporary mode. In the second example, the control device 100 estimates the travel state in the ineffective period PB based on the normal sensor-detected information SEN in the effective period PA. More specifically, the control device 100 assumes that a vehicle behavior in the effective period PA continues also in the ineffective period PB, and interpolates or extrapolates the travel state in the ineffective period PB by using the travel state in the effective period PA. Estimated travel state information EST indicates the travel state in the ineffective period PB thus estimated.

In the second example, the control device 100 sets the delay time DL of the trajectory following control as the delay compensation time L, as in the case of the normal mode. Then, the control device 100 executes the displacement estimation processing by using the sensor-detected information SEN in the effective period PA and the estimated travel state information EST in the ineffective period PB. The control device 100 does not use the sensor-detected information SEN in the ineffective period PB.

In the case of the second example, the delay compensation time L is prevented from becoming too short. Therefore, the delay compensation processing is performed effectively. Moreover, there is no need to switch (change) the delay compensation time L between the normal mode and the temporary mode. Accordingly, there is no need to switch the delay compensation processing.

3-2-3. Third Example of Temporary Mode

A third example is a combination of the first example and the second example described above. The control device 100 may switch the first example and the second example of the temporary mode as appropriate. For example, when a length of the effective period PA included in the delay time DL of the trajectory following control is equal to or more than a threshold, the control device 100 selects the first example of the temporary mode. On the other hand, when the length of the effective period PA included in the delay time DL of the trajectory following control is less than the threshold, the control device 100 selects the second example of the temporary mode.

According to the third example, the processing of estimating the travel state in the ineffective period PB is suppressed and thus a calculation load applied on the control device 100 is reduced. That is, it is possible to balance securing of the delay compensation time L and reduction of the calculation load.

3-2-4. Effects of Temporary Mode

According to the present embodiment, as described above, when the ineffective period PB is included in the delay time DL of the trajectory following control, the control device 100 executes the displacement estimation processing in the temporary mode. In the temporary mode, the control device 100 executes the displacement estimation processing by using the sensor-detected information SEN in the effective period PA without using the sensor-detected information SEN in the ineffective period PB. Since the sensor-detected information SEN in the ineffective period PB is not used, it is possible to suppress decrease in accuracy of the displacement estimation processing and thus the delay compensation processing. As a result, decrease in the trajectory following performance of the trajectory following control is suppressed.

Figure 11:
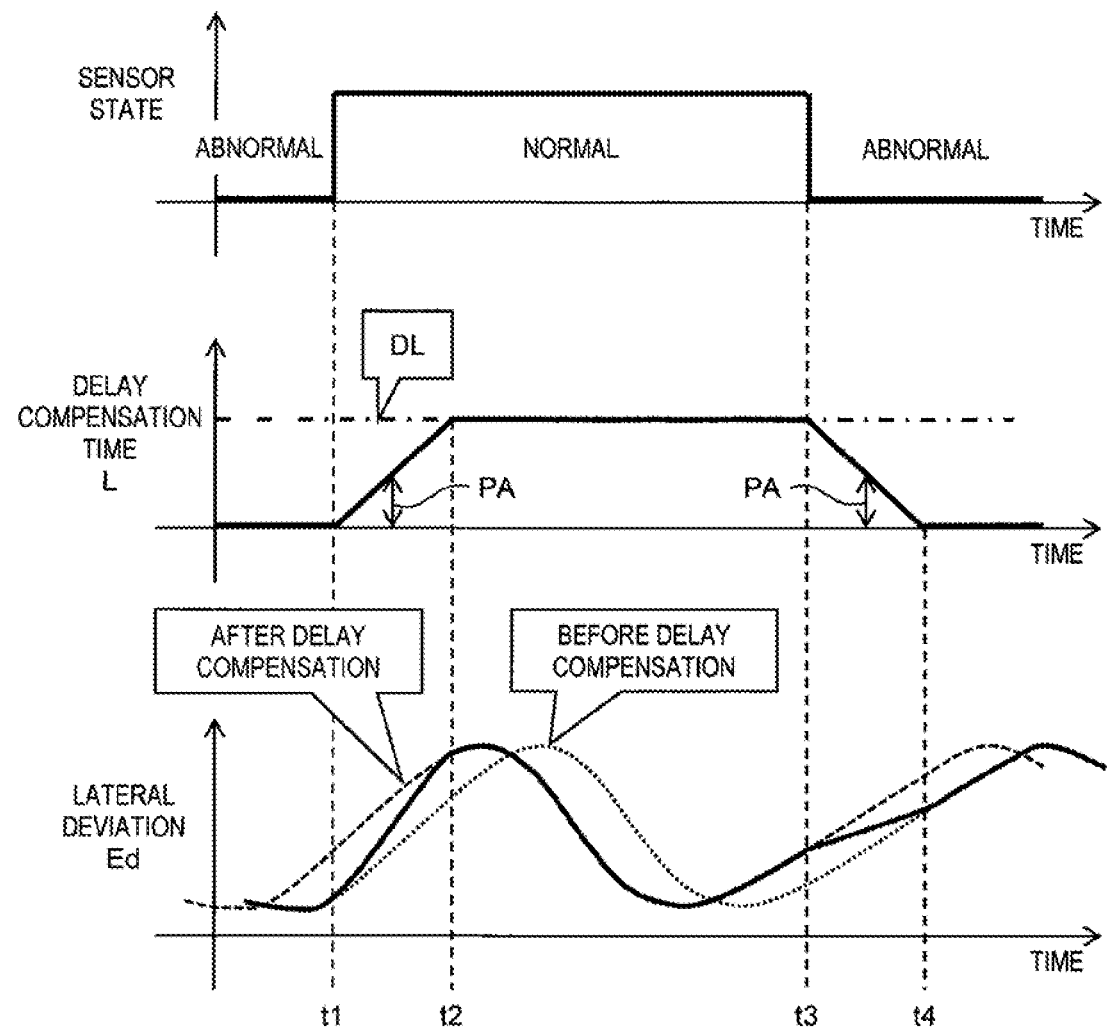
FIG. 11 is a timing chart for explaining effects of the temporary mode of the displacement estimation processing according to the embodiment of the present disclosure.

As a comparative example, let us consider a case where the displacement estimation processing and the delay compensation processing are totally halted when the ineffective period PB is included in the delay time DL. In the case of the comparative example, the delay compensation processing is not executed at all, the trajectory following performance of the trajectory following control is decreased after all. According to the present embodiment, on the other hand, when the ineffective period PB is included in the delay time DL, the control device 100 executes the displacement estimation processing in the temporary mode as much as possible. Therefore, decrease in the trajectory following performance of the trajectory following control is suppressed Effects of the temporary mode are further described with reference to FIG. 11. Time changes of a state of the travel state sensor 20, the delay compensation time L, and the lateral deviation Ed are shown in FIG. 11. The case of the first example of the temporary mode (see FIG. 9) is considered here. The same applies to the case of the second example (see FIG. 10).

At a time t1, the travel state sensor 20 returns to a normal state. After the time t1, the effective period PA included in the delay time DL gradually increases. As a result, the delay compensation time L also gradually increases. At a time t2, the effective period PA becomes equal to the delay time DL, and the control device 100 starts to execute the displacement estimation processing in the normal mode. As shown in FIG. 11, in a period from the time t1 to the time t2, the amount of correction of the lateral deviation Ed by the delay compensation processing gradually changes. In other words, the lateral deviation Ed gradually changes without switching discontinuously.

At a time t3, an error occurs in the travel state sensor 20, and the control device 100 starts to execute the displacement estimation processing in the temporary mode. After the time t3, the ineffective period PB included in the delay time DL gradually increases and the effective period PA gradually decreases. As a result, the delay compensation time L also gradually decreases. At a time time t4, the delay compensation time L becomes zero. As shown in FIG. 11, in a period from the time t3 to the time t4, the amount of correction of the lateral deviation Ed by the delay compensation processing gradually changes. In other words, the lateral deviation Ed gradually changes without switching discontinuously.

In the case of the comparative example described above, the displacement estimation processing and the delay compensation processing are not executed in the period from the time t1 to the time t2 and in the period from the time t3 to the time t4. Therefore, during those periods, the trajectory following performance of the trajectory following control is decreased.

According to the present embodiment, on the other hand, the control device 100 executes the displacement estimation processing in the temporary mode in the period from the time t1 to the time t2 and in the period from the time t3 to the time t4.

That is, the control device 100 does not totally give up the displacement estimation processing but executes the displacement estimation processing as much as possible. Therefore, decrease in the trajectory following performance of the trajectory following control is suppressed, as compared with the case of the comparative example.

Moreover, in the case of the comparative example described above, the delay compensation processing switches from OFF to ON at the time t2, and the delay compensation processing switches from ON to OFF at the time t3. As a result, the lateral deviation Ed switches (changes) discontinuously. Since the lateral deviation Ed switches discontinuously, the vehicle control amount in the travel control processing (Step S140) switches discontinuously. Such the discontinuous switching (change) of the vehicle control amount decreases stability of the vehicle travel and causes a sense of strangeness against the vehicle travel.

According to the present embodiment, on the other hand, ON/OFF of the delay compensation processing does not switch suddenly. Since there is the temporary mode, the amount of correction of the lateral deviation Ed by the delay compensation processing gradually changes, as described above. The lateral deviation Ed gradually changes without switching discontinuously. Therefore, the vehicle control amount in the travel control processing (Step S140) is prevented from switching discontinuously. This contributes to increase in the stability of the vehicle travel and reduction in the sense of strangeness.

3-3. Example of Processing by Control Device

Figure 12:
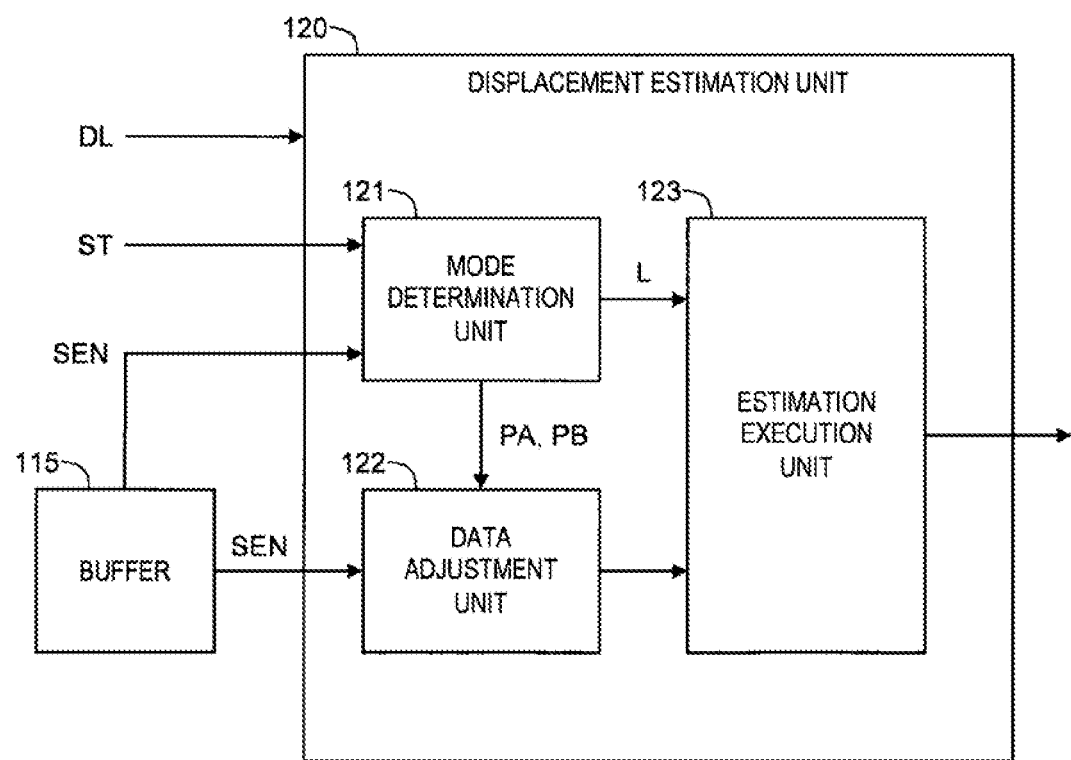
FIG. 12 is a block diagram showing an example of a functional configuration related to the displacement estimation processing according to the embodiment of the present disclosure.

FIG. 12 is a block diagram showing an example of a functional configuration related to the displacement estimation processing according to the present embodiment. The displacement estimation unit 120 includes a mode determination unit 121, a data adjustment unit 122, and an estimation execution unit 123. These functional blocks are achieved by the processor 101 of the control device 100 executing the control program stored in the memory 102.

3-3-1. Mode Determination Processing

The mode determination unit 121 executes mode determination processing that determines the mode of the displacement estimation processing. The mode determination unit 121 first determines (predicts) the effective period PA and the ineffective period PB. The effective period PA is a period in which the displacement estimation processing is effective. The ineffective period PB is a period in which the displacement estimation processing is ineffective.

For example, the travel state sensor 20 outputs a sensor state signal ST indicating its own state. The mode determination unit 121 receives the sensor state signal ST from the travel state sensor 20. Then, the mode determination unit 121 determines whether or not the travel state sensor 20 is normal based on the sensor state signal ST. The mode determination unit 121 sets a period in which the travel state sensor 20 is normal as the effective period PA. On the other hand, the mode determination unit 121 sets a period in which the travel state sensor 20 is abnormal as the ineffective period PB/

It should be noted that the travel state sensor 20 includes plural kinds of sensors, as shown in FIG. 2. "The travel state sensor 20 being normal" means that all sensors detecting parameters used for the displacement estimation processing are normal. "The travel state sensor 20 being abnormal" means that at least one of the sensors detecting parameters used for the displacement estimation processing is abnormal. For example, when the vehicle speed V and the yaw rate YR are used in the displacement estimation processing, a period in which both the vehicle speed sensor 21 and the yaw rate sensor 22 are normal is the effective period PA.

As another example, the mode determination unit 121 may determine the effective period PA and the ineffective period PB based on the sensor-detected information SEN stored in the buffer 115. When the travel state sensor 20 is abnormal, a parameter obtained from the sensor-detected information SEN deviates from a normal range. Here, the parameter is exemplified by the detected value itself, a derivative of the detected value, and so forth. When the parameter is within the normal range, the mode determination unit 121 indirectly determines that the travel state sensor 20 is normal. On the other hand, when the parameter deviates from the normal range, the mode determination unit 121 indirectly determines that the travel state sensor 20 is abnormal.

When a predetermined displacement estimation model is used for the displacement estimation processing, the mode determination unit 121 may determine whether or not the travel state of the vehicle 1 complies with the displacement estimation model. For example, let us consider a case where the displacement estimation model is based on an assumption that the vehicle 1 travels on a flat road surface. The sensor-detected information SEN includes the acceleration detected by the acceleration sensor 23. The mode determination unit 121 calculates a road surface slope based on the acceleration. When the road surface slope is beyond an allowable range allowed in the displacement estimation model, the mode determination unit 121 determines that the displacement estimation processing will result in ineffective.

In this manner, the mode determination unit 121 determines (predicts) the effective period PA and the ineffective period PB based on at least one of the sensor state signal ST and the sensor-detected information SEN. When the ineffective period PB is not included in the delay time DL of the trajectory following control, the mode determination unit 121 selects the normal mode. On the other hand, when the ineffective period PB is included in the delay time DL of the trajectory following control, the mode determination unit 121 selects the temporary mode. That is to say, the mode determination unit 121 switches the mode of the displacement estimation processing between the normal mode and the temporary mode according to whether or not the ineffective period PB is included in the delay time DL of the trajectory following control.

Furthermore, the mode determination unit 121 sets the delay compensation time L used for the displacement estimation processing. More specifically, in the case of the normal mode (see FIG. 7), the mode determination unit 121 sets the delay time DL as the delay compensation time L. In the case of the first example of the temporary mode (see FIG. 9), the mode determination unit 121 sets the effective period PA as the delay compensation time L. In the case of the second example of the temporary mode (see FIG. 10), the mode determination unit 121 sets the delay time DL as the delay compensation time L. The mode determination unit 121 notifies the estimation execution unit 123 of the set delay compensation time L.

Moreover, the mode determination unit 121 notifies the data adjustment unit 122 of the effective period PA and the ineffective period PB.

3-3-2. Data Adjustment Processing

The data adjustment unit 122 appropriately reads out the sensor-detected information SEN stored in the buffer 115. In the case of the normal mode, the data adjustment unit 122 outputs the sensor-detected information SEN in the delay time DL as it is to the estimation execution unit 123. In the case of the temporary mode, the data adjustment unit 122 executes data adjustment processing.

More specifically, in the case of the first example of the temporary mode, the data adjustment unit 122 outputs only the sensor-detected information SEN in the effective period PA to the estimation execution unit 123. In other words, the data adjustment unit 122 masks the sensor-detected information SEN in the ineffective period PB.

In the case of the second example of the temporary mode, the data adjustment unit 122 estimates the travel state in the ineffective period PB based on the normal sensor-detected information SEN in the effective period PA. More specifically, the data adjustment unit 122 assumes that the vehicle behavior in the effective period PA continues also in the ineffective period PB, and interpolates or extrapolates the travel state in the ineffective period PB by using the travel state in the effective period PA. The data adjustment unit 122 acquires the estimated travel state information EST indicating the travel state in the ineffective period PB estimated. Then, the data adjustment unit 122 outputs the sensor-detected information SEN in the effective period PA and the estimated travel state information EST in the ineffective period PB to the estimation execution unit 123.

3-3-3. Estimation Execution Processing

The estimation execution unit 123 executes the displacement estimation processing. In the case of the normal mode (see FIG. 7), the estimation execution unit 123 executes the displacement estimation processing by using the sensor-detected information SEN in the delay compensation time L (=the delay time DL).

In the case of the first example of the temporary mode (see FIG. 9), the estimation execution unit 123 executes the displacement estimation processing by using the sensor-detected information SEN in the delay compensation time L (=the effective period PA).

In the case of the second example of the temporary mode (see FIG. 10), the estimation execution unit 123 executes the displacement estimation processing by using the sensor-detected information SEN in the effective period PA and the estimated travel state information EST in the ineffective period PB.

3-3-4. Modification Example

Figure 13:
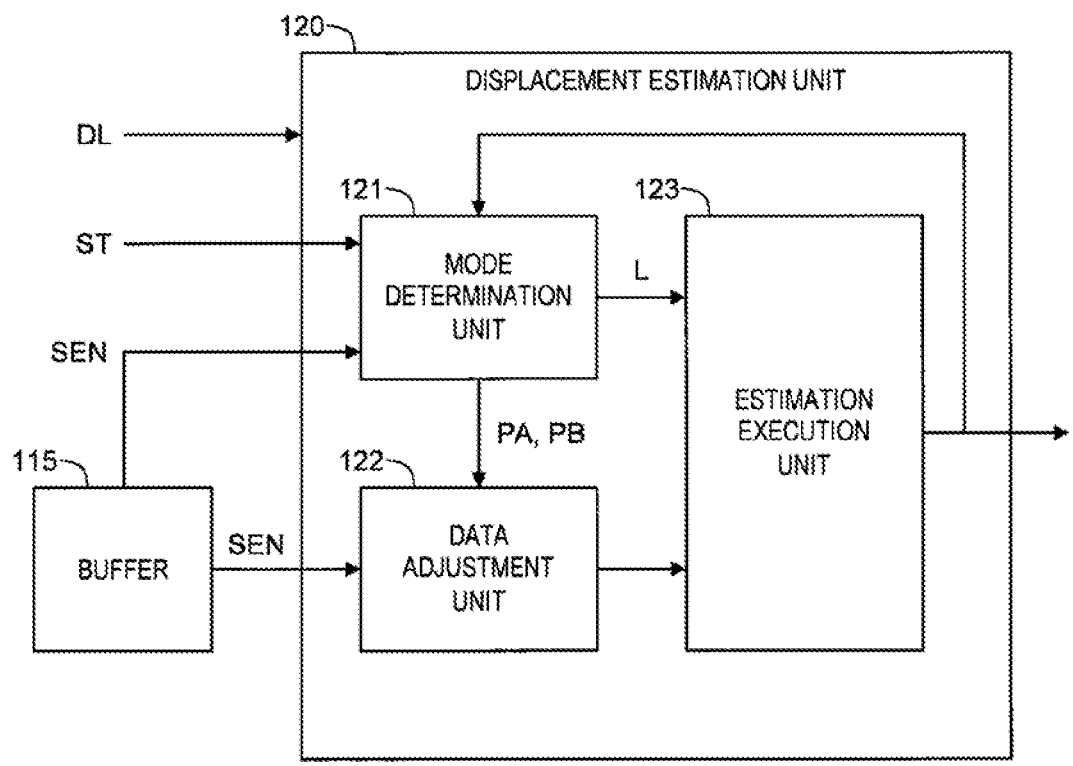
FIG. 13 is a block diagram for explaining a modification example of the displacement estimation processing according to the embodiment of the present disclosure.

FIG. 13 is a block diagram for explaining a modification example. In the modification example, the mode determination unit 121 tentatively selects the normal mode. The estimation execution unit 123 executes the displacement estimation processing in the normal mode to tentatively estimate the displacement. The displacement tentatively estimated in the normal mode is fed back to the mode determination unit 121.

If the displacement estimation processing is ineffective, a parameter obtained from the tentatively-estimated displacement deviates from a normal range. Here, the parameter is exemplified by the displacement itself, a derivative of the displacement, and so forth. When the parameter is within the normal range, the mode determination unit 121 determines that the displacement estimation processing is effective. On the other hand, when the parameter deviates from the normal range, the mode determination unit 121 determines that the displacement estimation processing is ineffective.

3-3-5. Flow of Displacement Estimation Processing

Figure 14:
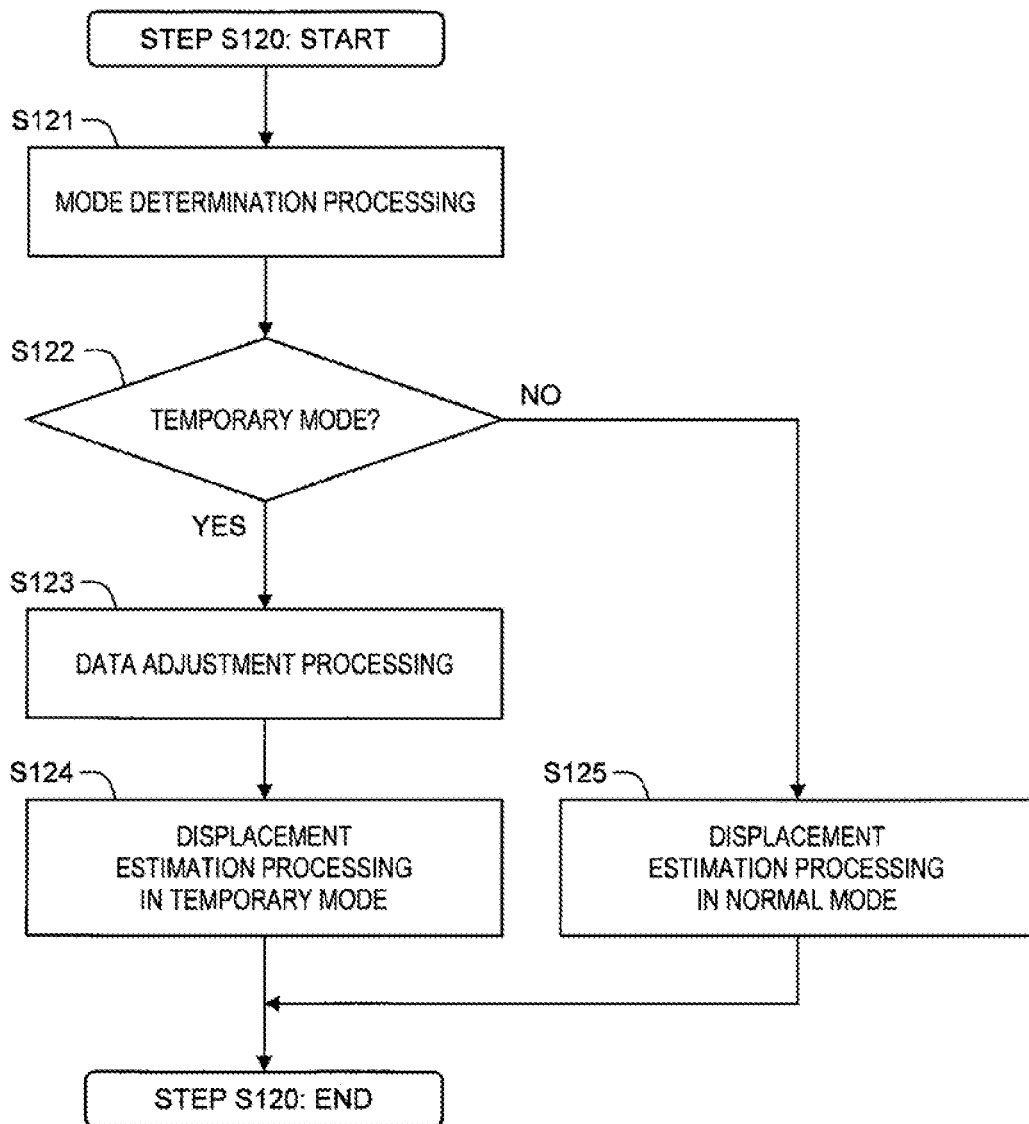
FIG. 14 is a flow chart summarizing the displacement estimation processing according to the embodiment of the present disclosure.

FIG. 14 is a flow chart summarizing the displacement estimation processing (Step S120) according to the present embodiment.

In Step S121, the control device 100 executes the mode determination processing. More specifically, the control device 100 switches the mode of the displacement estimation processing between the normal mode and the temporary mode according to whether or not the ineffective period PB is included in the delay time DL of the trajectory following control.

When the ineffective period PB is included in the delay time DL, the control device 100 selects the temporary mode (Step S122; Yes). In this case, the control device 100 executes the data adjustment processing (Step S123). Then, the control device 100 executes the displacement estimation processing in the temporary mode (Step S124).

On the other hand, when the ineffective period PB is not included in the delay time DL, the control device 100 selects the normal mode (Step S122; No). In this case, the control device 100 executes the displacement estimation processing in the normal mode (Step S125).

4. Modification Example of Travel Control Processing

When the displacement estimation processing is executed in the temporary mode, accuracy of the delay compensation processing is decreased as compared with the case where the displacement estimation processing is executed in the normal mode. Therefore, the control device 100 (the travel control unit 140) may execute the travel control processing (Step S140) such that stability of the vehicle 1 is secured.

Figure 15:
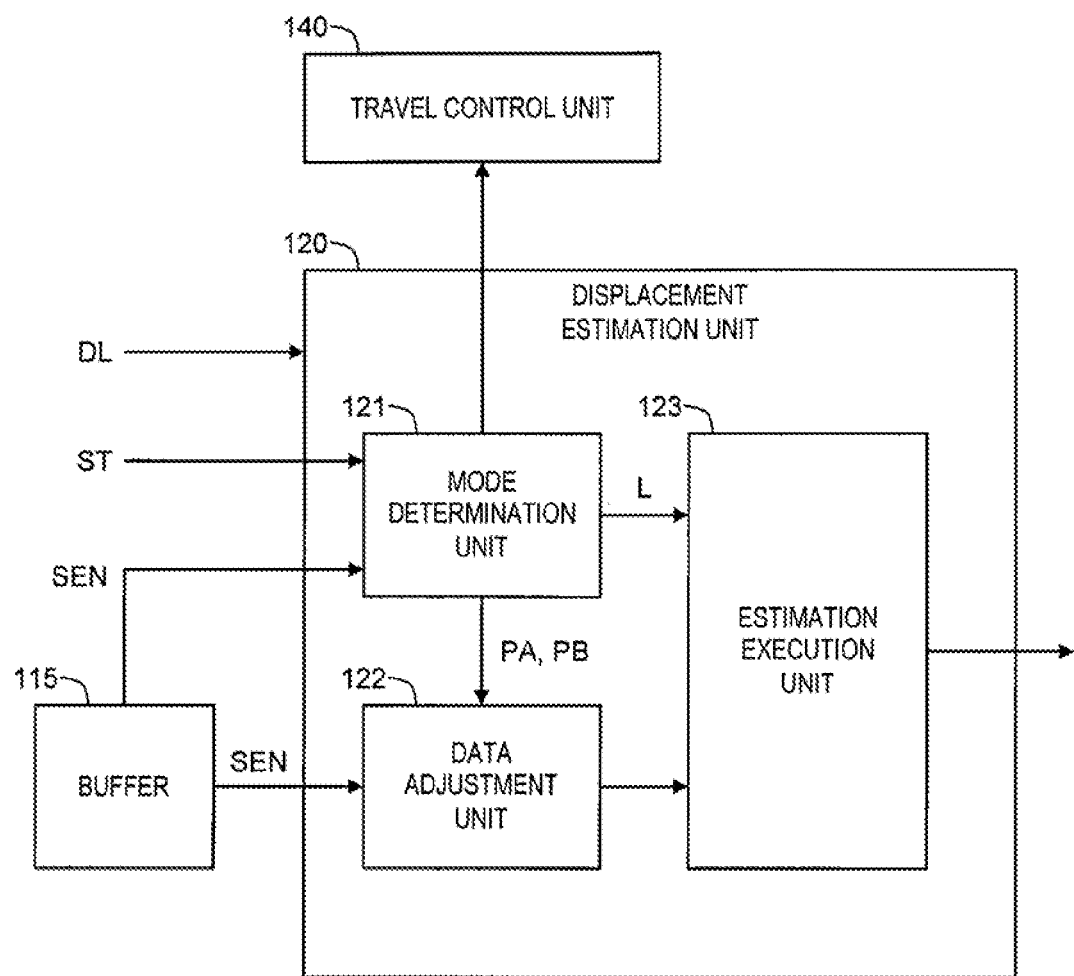
FIG. 15 is a block diagram showing a modification example of travel control processing according to the embodiment of the present disclosure.

For example, as shown in FIG. 15, the displacement estimation unit 120 (the mode determination unit 121) notifies the travel control unit 140 of the selected mode of the displacement estimation processing. The travel control unit 140 adjusts the control gains Ga and Gb in the above-mentioned Equation (1) according to the selected mode. More specifically, when the displacement estimation processing is executed in the temporary mode, the travel control unit 140 decreases the control gains Ga and Gb as compared with the case where the displacement estimation processing is executed in the normal mode.

Amounts of decrease (adjustment) in the control gains Ga and Gb may be variable. For example, the travel control unit 140 changes the amounts of decrease in the control gains Ga and Gb according to a length of the ineffective period PB included in the delay time DL of the trajectory following control. The amounts of decrease in the control gains Ga and Gb increase as the ineffective period PB included in the delay time DL becomes longer (i.e., as the effective period PA becomes shorter).

Since the control gains Ga are Gb are decreased, the vehicle control amount is suppressed. Therefore, even when the displacement estimation processing is executed in the temporary mode, wobble of the vehicle 1 is suppressed and the stability of the vehicle travel is secured.

What is claimed is:

1. A vehicle travel control device that controls travel of a vehicle, the vehicle travel control device comprising a controller configured to:
   generate a target trajectory of the vehicle:
   acquire, by a sensor installed on the vehicle, a first sensor detected information in a first period and a second sensor detected information in a second period, wherein the first period and the second period are different, and wherein the first sensor detected information and the second sensor detected information are detected between a time at which the target trajectory is generated and a delay time after the time at which the target trajectory is generated, the delay time representing control delay in the vehicle travel control;
   when the first sensor detected information has an abnormality, estimate a displacement of the vehicle based on the second sensor detected information; and
   execute vehicle travel control that controls travel of the vehicle to decrease a deviation between vehicle displacement and the target trajectory based on the estimated displacement.

2. The vehicle travel control device according to claim 1, wherein
   the controller is further configured to estimate the displacement of the vehicle based on the second sensor detected information detected in the second period without using the first sensor detected information detected in the first period.

3. The vehicle travel control device according to claim 1, wherein the controller is further configured to:
   estimate the first sensor detected information in the first period based on the second sensor detected information detected in the second period; and
   estimate the displacement of the vehicle based on the second sensor detected information detected in the second period and the estimated first sensor detected information in the first period.

4. The vehicle travel control device according to claim 1, wherein the time at which the target trajectory is generated is a first timing, wherein a second timing is later than the first timing by the delay time, and wherein
   when a length of the second period between the first timing and the second timing is equal to or greater than a threshold, the controller is configured to estimate the displacement of the vehicle based on the second sensor detected information detected in the second period, and
   when the length of the second period between the first timing and the second timing is less than the threshold, the controller is configured to estimate the first sensor detected information in the first period based on the second sensor detected information detected in the second period, and to estimate the displacement of the vehicle based on the second sensor detected information detected in the second period and the estimated sensor detected information in the first period.

5. The vehicle travel control device according to claim 1, wherein the controller is further configured to:
   correct the deviation between the vehicle displacement and the target trajectory based on the estimated displacement to compensate the control delay in the vehicle travel control; and
   execute the vehicle travel control to decrease the corrected deviation.

* * * * *